United States Patent [19]

Weinstock et al.

[11] 3,885,452

[45] May 27, 1975

[54] ROCKET CATAPULT AIRCRAFT ESCAPE ARRANGEMENT

[75] Inventors: Manuel Weinstock, Philadelphia, Pa.; Frank T. Pisano, Voorhees, N.J.

[73] Assignee: The United States of America as represented by the Secretary of the Army, Washington, D.C.

[22] Filed: Feb. 12, 1974

[21] Appl. No.: 441,915

[52] U.S. Cl. ............. 89/1.807; 89/1.814; 89/1.818; 89/1.819; 244/122 AB
[51] Int. Cl............................................. F41f 3/06
[58] Field of Search ..... 89/1.8, 1.806, 1.807, 1.813, 89/1.814, 1.818, 1.819; 102/34, 34.2, 34.5; 244/122 AB, 122 AD, 141

[56] References Cited
UNITED STATES PATENTS
3,807,670    4/1974    Sutter.......................... 244/122 AB Primary Examiner—Stephen C. Bentley
Attorney, Agent, or Firm—Robert P. Gibson; Nathan Edelberg

[57] ABSTRACT

A rocket catapult emergency aircraft escape arrangement which is simple in construction and has a maximum of functional reliability. A booster tube of the rocket catapult assembly is secured to a pedestal attached to the aircraft frame and has in one end thereof a cartridge ignited by an electric ignition element in the pedestal. A launch tube of the rocket motor assembly is slidably mounted on the booster tube, secured to a rearwardly exhausting nozzle unit, and carries at its forward end a delay rocket motor igniter unit that ignites the cylinder of rocket propellant grain carried by the rocket tube forwardly of its securement to the nozzle unit. A pair of apertured ears on a rearward portion of the nozzle unit afford connection to a pendant line of a seat occupant's shoulder harness. Upon an emergency escape operation, the actuated rocket catapult lifts the occupant escapee from the disabled craft as soon as his shoulder harness pendant line becomes taut.

5 Claims, 3 Drawing Figures

PATENTED MAY 27 1975
3,885,452
SHEET 1
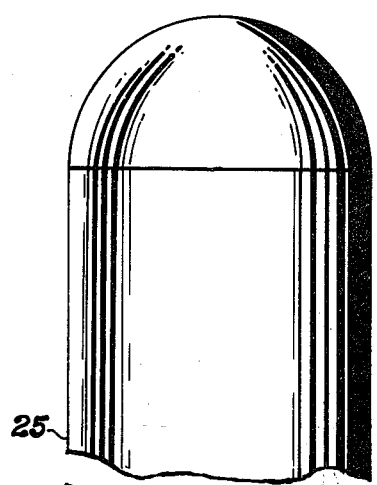
FIG.1
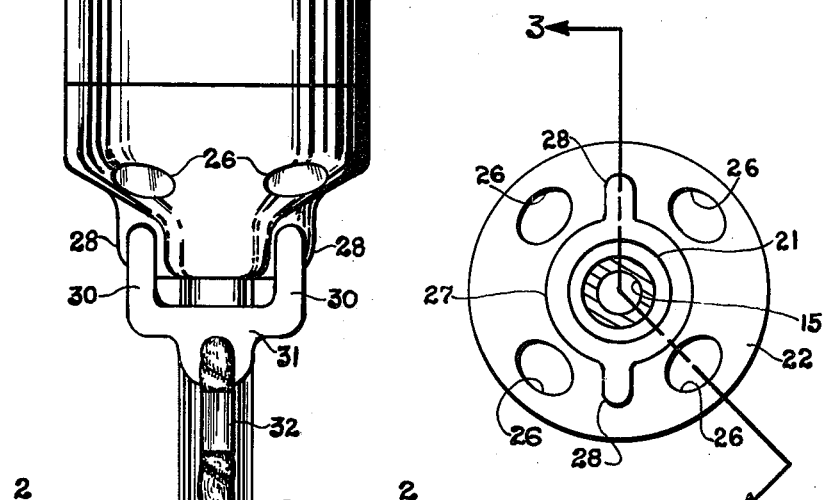
FIG.2
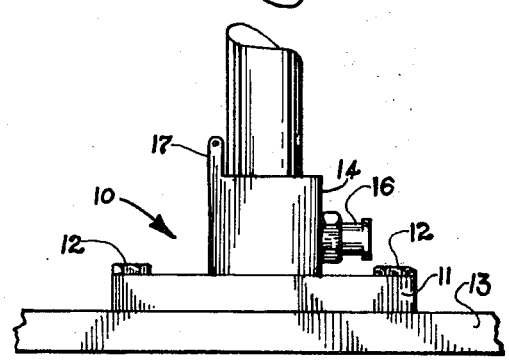

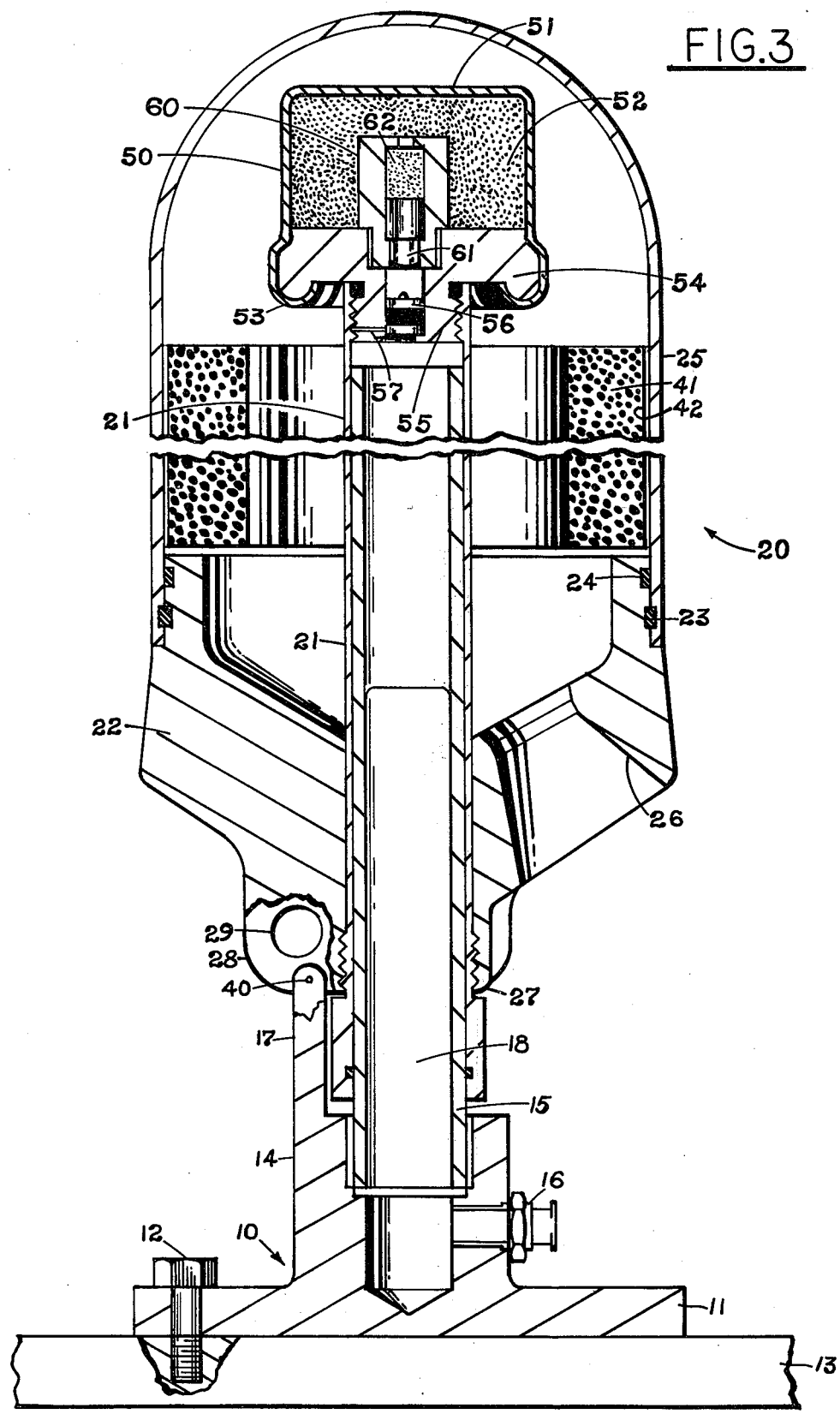

ROCKET CATAPULT AIRCRAFT ESCAPE ARRANGEMENT

The invention described herein may be manufactured, used, and licensed by or for the Government for governmental purposes without the payment to us of any royalty thereon. su This invention relates to rocket motors, and more particularly to an extraction rocket motor for emergency escape from an aircraft.

One of the objects of the invention is to provide a rocket catapult emergency aircraft escape arrangement that has a maximum of functional reliability.

Another object of the invention is to provide such an arrangement which is simple in construction.

These and other objects, features and advantages will become more apparent from the following description and accompanying drawings in which:

FIG. 1 is an elevated view of a preferred rocket catapult emergency aircraft escape arrangement with the rocket motor operatively extended along and about to depart from the booster tube.

FIG. 2 is a sectional view taken along line 2—2 of FIG. 1, with certain parts omitted.

FIG. 3 is an enlarged substantially sectional view taken along lines 3—3 of FIG. 2, with the parts in their original pre-ignition positions.

The pedestal, shown generally at 10 (FIGS. 1, 3), has a base portion 11, plurally apertured for receiving corresponding mounting elements 12 by which the pedestal is secured to the aircraft deck or frame 13, and an upstanding tubular portion 14 the open end of which is internally threaded for securement of a mating threaded end of booster tube 15. Tubular portion 14 has a laterally directed tapped opening in which an appropriate electric ignition element 16 is mounted, and a bifurcated leg or protrusions 17 that is laterally apertured for a purpose to be described. The pedestal supports a rocket catapult assembly, shown generally at 20 (FIG. 3), of the aircraft emergency escape system. The booster tube 15 of the rocket catapult assembly contains a propellant charge cartridge 18 that is slidably inserted in the booster tube rearward end and is in fluid communication with and ignited by the electric ignition element 16.

The rocket motor assembly includes a launch tube 21 that is slidably mounted on the booster tube and threadedly secured to a centrally tapped opening in the rearward hub end 27 of a nozzle unit 22. By means of a wire lock 23 rearwardly adjacent O-ring seal 24, the nozzle unit 22 is secured to the rearward end of rocket tube 25. Nozzle unit 22 preferably includes two pairs of diametrically opposed rearwardly exhausting exit nozzles 26 (FIGS. 1, 2, 3) the adjacent ones of which are circumferentially arranged equidistant from each other, with each nozzle axis being directed at a predetermined inclination relative to the longitudinal axis of the launch tube. The central hub portion 27 has a pair of diametrically opposed laterally extending ears 28 each having a transverse aperture 29 by which the predeterminedly spaced legs 30 of bridle or yoke 31 (FIG. 1) are appropriately secured in a manner that will permit at least a limited amount of swinging motion. By means of a suitable braided connection 32 the apertured central portion of the yoke 31 has secured thereto one end of a pendant line 33 that connects with the shoulder harness (not shown) worn by the prospective escapee or aircraft occupant. A rearmost portion of one of the nozzle unit ears 28 is initially positioned in the slot of the pedestal bifurcated leg 17 and held against movement relative thereto by a transversely extending shear pin 40 (FIG. 3) prior to ignition of cartridge 18.

The rocket motor assembly also includes a cylindrical tube of rocket propellant grain 41 that spacingly surrounds a substantial length of the launch tube 21 and closely fits within rocket tube 25 with an inhibitor 42 positioned intermediate the rocket grain 41 and rocket tube 25. The inhibitor 42 preferably covers and is cemented to the outer surface area of the rocket grain 41. Within the closed forward end of the rocket tube 25, a delay rocket motor igniter unit or assembly 50 is secured to the launch tube 21. The delay rocket igniter unit includes a cylindrical aluminum case or container 51 substantially filled with black powder rocket igniter 52 and having its rearward annular end portion 53 crimpingly secured to peripheral portions of aluminum cartridge head 54. The cartridge head has a rearwardly extending central portion 55 of reduced size that is threadedly secured within the forwardmost portion of launch tube 21 and has a central passageway in which the firing pin 56 is slidably mounted. The firing pin 56 has an appropriate lateral recess to receive the inner end of a retaining shear pin 57 that upon assembly is held in the desired position in a transverse passage in the cartridge head reduced portion 55 to normally hold the firing pin 56 in its rearmost initial position adjacent the centrally apertured rearmost wall of cartridge head portion 55. An aluminum delay element cup 60, theadedly secured to a tapped central counterbore in the forward end of cartridge head 54, is substantially embedded in the black powder rocket igniter 52 and contains, within a suitable passageway therethrough, the delay element primer 61 and the cylindrical length of delay ignition mix 62 which is in fluid communication with the black powder rocket igniter 52.

When the cartridge 18 is ignited by electric igniter 16, in response to a condition where the aircraft becomes disabled or the like and it is desired to eject an occupant from the craft prior to parachute deployment, the pressure gas generated thereby will substantially simultaneously act on the rearward end of cartridge head 54 and the firing pin 56 to rupture shear pin 40, slidingly move the rocket motor assembly launch tube 21 along the booster tube 15 prior to their separation, rupture the shear pin 57, and actuate the firing pin 56. The firing pin 56 will effect a sequential ignition of the delay ignition mix 62, the rocket igniter 52 and the main rocket grain 41. As the generated rocket gas exhausts through nozzles 26, the pendant line 33 will have become taut and the elevating rocket motor will lift the occupant out of the aircraft through an appropriate hatch to a predetermined elevation for safe parachute deployment.

Various modifications, alternations or changes may be resorted to without departing from the scope of the invention as defined in the appended claims.

We claim:

1. In an aircraft emergency escape system having a pedestal attached to an aircraft frame and supporting a rocket catapult assembly,
said rocket catapult assembly having a booster tube secured to said pedestal,
a booster propellant charge cartridge positioned in one end of said booster tube adjacent said pedestal,
an electric ignition element secured to said pedestal and in fluid communication with said cartridge,
a rocket motor assembly comprising a launch tube slidably mounted on said booster tube and secured to a rearwardly exhausting nozzle unit, a rocket tube secured to said nozzle unit and containing a cylinder of rocket propellant grain, and a delay rocket motor igniter unit secured to said launch tube adjacent the other end of said booster tube,
a shear pin connecting said nozzle unit to said pedestal, and
means on said nozzle unit for connection to a pendant line of a seat occupant's shoulder harness.

2. The structure in accordance with claim 1 wherein said delay rocket motor igniter unit includes a cartridge head threadedly secured to a forward end of said launch tube and containing a firing pin, a delay element cup threadedly secured to said cartridge head and containing a primer and a delay ignition mix, a container secured to said cartridge head, and a rocket igniter in said container and in fluid communication with said delay ignition mix.

3. The structure according to claim 2 wherein said delay element cup is substantially embedded in said rocket igniter and has an aperture in its forward end for fluidly communicating said delay ignition mix with said rocket igniter, and said delay ignition mix is a solid propellant grain.

4. The structure of claim 3 wherein said firing pin is in longitudinal alignment with said primer and in fluid communication with said cartridge, and a shear pin extends laterally through a portion of said cartridge head and is in a detent engagement with said firing pin.

5. The structure of claim 4 wherein said connection means includes a pair of apertured ears on a rearward portion of said nozzle unit.

* * * * *